April 12, 1938.                B. T. PERRY                2,114,029
                             TESTING MACHINE
                          Filed Sept. 29, 1936
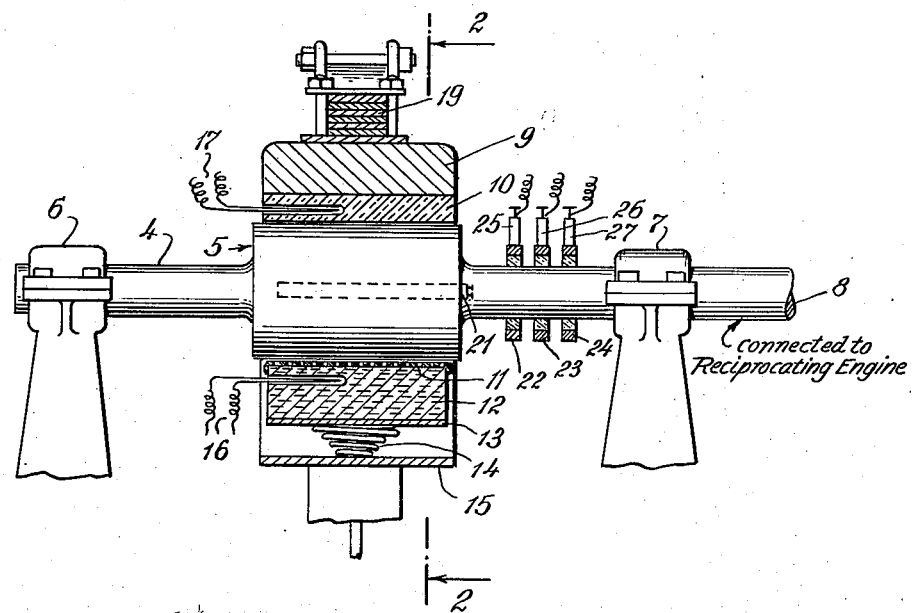
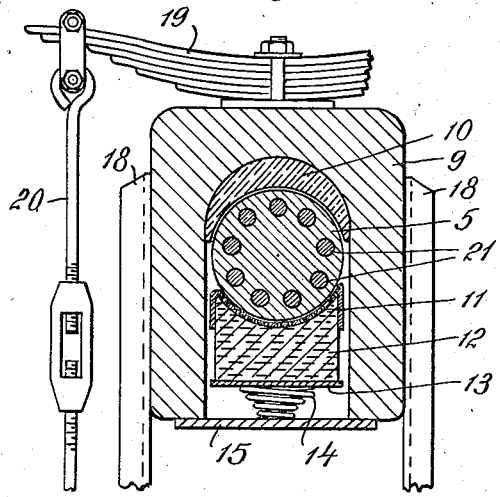
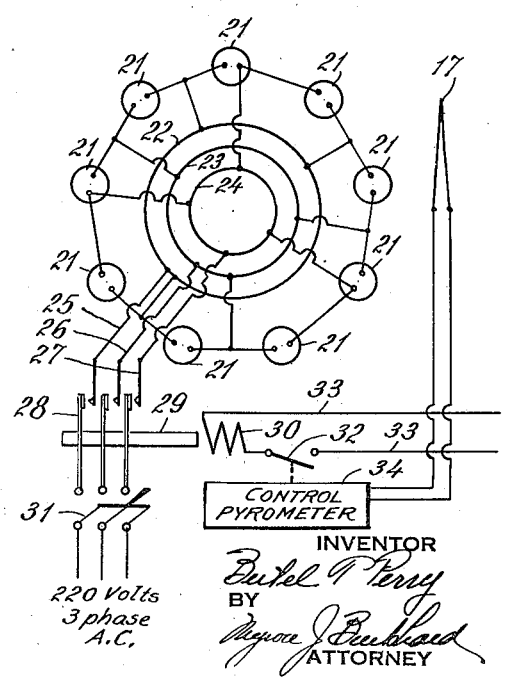

Patented Apr. 12, 1938

2,114,029

UNITED STATES PATENT OFFICE 2,114,029

TESTING MACHINE

Bertel T. Perry, Franklin, Pa., assignor to Socony-Vacuum Oil Company, Incorporated, New York, N. Y., a corporation of New York Application September 29, 1936, Serial No. 103,082

4 Claims. (Cl. 73—51)

This invention is directed to the provision of a testing machine capable of testing locomotive driving journal greases under conditions not only similar to those met in service, but under abnormal conditions, such as arise from the development of hot boxes and the like.

Of particular interest is the necessity for study of such lubricants and their action under elevated temperatures. Failure under such conditions, or failure leading to such conditions, commonly spoken of as "hot boxes" are rare, but disabling when they do occur. Inability to study such failures under actual service may be seen from the fact that in one series of tests, extending over 20,000 miles of run, no hot boxes were encountered. Studies of greases under service conditions up to and exceeding "hot box" temperatures are valuable to determine the effect of elevated temperatures upon the feeding characteristics of driving journal greases, and to determine consumption rates at various elevated temperatures not sufficiently high to be termed a "hot box". These studies are also desirable in determining whether the lubricant has characteristics which help to maintain a supply of lubricant in the cellar even while the shaft is operating at temperatures which would quickly exhaust inferior lubricants with subsequent damage to journal and bearing. With inferior lubricants, a "hot box" in service usually results in complete exhaustion of the supply of lubricant.

The object of this invention is the provision of a testing machine capable of accurately reproducing not only the general conditions of locomotive operation, but of accurately and reproducibly simulating elevated temperature level operating in order that the behavior of locomotive driving journal greases at temperatures sufficiently high to cause incipient or actual failure may be exhaustively studied. Many means exist by which the ordinary mechanical conditions of operation may be copied. I am aware of no prior machine capable of accurately and reproducibly simulating elevated bearing temperatures generated in a manner in any way analogous to that in which they are actually generated in use.

This invention is based upon the discovery that if the axle be internally heated by suitable means, such simulation of actual conditions may be arrived at and studies of the actual behaviour of the grease will be possible.

To more clearly understand this invention, reference is now made to the drawing attached to this specification, in which Fig. 1 shows a diagrammatic elevation, partially in section, of the testing machine; Fig. 2 shows a section taken along the line 2—2 of Fig. 1; and Fig. 3 shows a wiring diagram. In Fig. 1, 4 is a shaft, enlarged in its central portion 5, to the size of a locomotive driving axle and supported by bearings 6 and 7. This shaft is driven by having its inboard end 8 connected to the shaft of an ordinary reciprocating steam engine, not shown. Surrounding the central enlarged portion 5 of the shaft 4 there is an assembly duplicating the journal box assembly of the locomotive, consisting of a journal box 9, in which there is mounted a crown brass 10, which rests upon axle 5. Below the axle 5, in the cellar of the journal box 9, there is mounted the usual lubricating assembly, consisting of a perforated plate 11, and a block of grease designated by 12, which is pressed against the axle by follower plate 13, actuated by spring 14, which works against the cellar floor plate 15. Actual details of this assembly may vary from the diagrammatic showing in slight details, but the diagram shows the essential elements of the common driving journal setup.

To observe the temperatures obtaining during test, pyrometer 16 is mounted in the grease block 12 and pyrometer 17 is mounted in the crown brass 10.

Heating of the assembly to simulate "hot box" conditions is accomplished by several "cartridge type" electrical heating units, mounted in axle 5, only one of which is shown in Fig. 1. To carry electrical current to these heating units, the shaft 4 is equipped with three slip rings 22, 23, 24, to which contact is made from an outside power source by brushes 25, 26, 27. The wiring between these rings and the heater units is omitted from Fig. 1 to avoid complication of the drawing, but is diagrammed in Fig. 3, which will be discussed later.

Turning now to Fig. 2, which is a section taken along line 2—2 of Fig. 1, there is shown the journal box 9, crown brass 10, and lubricating assembly 11, 12, 13, 14, 15, surrounding axle 5, in which nine cartridge type heater units 21 are shown. To load the axle, the following features are used. The journal box 9, supported by the axle 5 is free to move vertically, guided by posts 18, 18. Mounted upon the top of journal box 9 is a semi-elliptical spring 19, of the usual type, and each of its ends are pulled downward by turnbuckles attached to shackles 20, one of which is not shown. By this means, any desired loading of the axle can be accomplished.

Fig. 3 sets forth the manner of wiring and control of the heating elements 21. These elements are actuated by 220 volt, three-phase, alternating current, each element being connected to two of the leads therefrom as shown by fixed connections to two of the slip rings 22, 23, 24. These slip rings are connected to the outside source of power by brushes 25, 26, 27, which in turn are led through a magnetic control switch 28 and a cut-off switch 31. The magnetic control switch 28 comprises a solenoid bar 29, which carries the moving set of contacts, and a solenoid coil 30, which, when the switch 31 is closed, is actuated by current from an outside source through 33—33 and moves solenoid bar 29 to close magnetic switch 28. Such magnetic switches are commonly available and their details are no part of this invention. The amount of heating is regulated by a controlling pyrometer instrument 34 as shown, connected either to thermocouple 17, as shown, or to thermocouple 16 if desired. When the temperature observed by 17 is below that desired, for which the control pyrometer 34 is set, the pyrometer acts to close switch 32, and cause heating of the axle. When the temperature observed by 17 is above that desired, the instrument acts to open switch 32. Such control pyrometer instruments, acting to control switches and the like in accordance to the relation between an observed temperature and a desired temperature are of many types, well known in the art, and their details are no part of this invention.

The specific advantages of this heating method reside in the fact that the heat originates in the same members, and in the same location in those members, as it does in practical use, and is thereafter communicated to the grease supply assembly and affects the feeding surface of the grease block in exactly the same manner as it does in actual use. No other method of heating of which I am aware can do so. Accuracy of mechanical simulation of other service features is brought about in the usual way by use of actual service equipment, and additionally by the use of a reciprocating engine drive, which, together with the somewhat free mounting or floating mounting of the journal box upon the axle under the restraint of guide posts 18, gives rise to lateral motion or end play of similar frequency and magnitude to that observed in actual service.

Optional methods of internal heating of the axle, and of mounting the assembly to simulate service conditions will be suggested to those skilled in the art. All of these I consider to be the equivalent to those corresponding features herein disclosed, and within the scope of my invention as defined by the limitations expressed in the following claims.

I claim—

1. A locomotive driving journal grease testing apparatus comprising an axle, and assembled around said axle a standard assembly of journal box, crown brass, lubricant cellar and lubricating means, flexible guide means to position said assembly, means to apply load to said journal box, means to internally heat said axle to bring its peripheral surface to temperatures above atmospheric means to observe temperatures of selected portions of the assembly, and reciprocating engine means for driving said axle.

2. A locomotive driving journal grease testing apparatus comprising an axle, and assembled around said axle a standard assembly of journal box, crown brass, lubricant cellar and lubricating means, flexible guide means to position said assembly, means to apply load to said journal box, means to internally heat said axle to bring its peripheral surface to temperatures above atmospheric comprising a plurality of unit cartridge type electric heaters embedded therein, means to observe temperature of selected portions of the assembly, and reciprocating engine means for driving said axle.

3. Means for heating the surface of the axle of a locomotive driving journal grease testing machine, to simulate "hot box" and similar elevated temperature conditions therein, comprising a plurality of electrical resistance elements embedded in said axle near the bearing surface thereof, and means for connecting said resistance elements, during rotation of the axle, with a stationary power source.

4. Means for heating the surface of the axle of a locomotive driving journal grease testing machine, to simulate "hot box" and similar elevated temperature conditions therein, comprising a plurality of electrical resistance elements embedded in said axle near the bearing surface thereof, means for observing the temperature thus generated, and means for varynig the power input to the elements to maintain a desired temperature.

BERTEL T. PERRY.